(12) United States Patent
Denny et al.

(10) Patent No.: US 9,697,653 B2
(45) Date of Patent: Jul. 4, 2017

(54) METHOD, COMPUTER-READABLE STORAGE DEVICE AND APPARATUS FOR EXCHANGING VEHICLE INFORMATION

(71) Applicants: AT&T INTELLECTUAL PROPERTY I, L.P., Atlanta, GA (US); AT&T MOBILITY LLC, Atlanta, GA (US)

(72) Inventors: Michael S. Denny, Sharpsbury, GA (US); Brian Dominguez, Atlanta, GA (US); Brian Greaves, Atlanta, CA (US); Craig Lee, Frisco, TX (US); Ricardo Niedermeyer, Smyrna, GA (US); Steven Neil Tischer, Atlanta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/985,174

(22) Filed: Dec. 30, 2015

(65) Prior Publication Data
US 2016/0110930 A1    Apr. 21, 2016

Related U.S. Application Data

(63) Continuation of application No. 14/109,145, filed on Dec. 17, 2013, now Pat. No. 9,251,630.

(51) Int. Cl.
*G06F 7/00* (2006.01)
*G07C 5/00* (2006.01)
(Continued)

(52) U.S. Cl.
CPC ............ *G07C 5/008* (2013.01); *B60Q 3/00* (2013.01); *B60Q 9/00* (2013.01); *B60Q 11/005* (2013.01);
(Continued)

(58) Field of Classification Search
CPC combination set(s) only.
See application file for complete search history.

(56) References Cited

U.S. PATENT DOCUMENTS 5,546,311 A * 8/1996 Sekine ................. G08G 1/052
340/902
6,249,232 B1 * 6/2001 Tamura ................. G08G 1/163
180/167
(Continued)

FOREIGN PATENT DOCUMENTS

WO    WO 0195287 A1    12/2001

OTHER PUBLICATIONS

ElBatt, Tamer, et al. "Cooperative collision warning using dedicated short range wireless communications." Proceedings of the 3rd international workshop on Vehicular ad hoc networks. ACM, 2006.
(Continued)

*Primary Examiner* — Bhavesh V Amin (57) ABSTRACT

A method, computer-readable storage device and apparatus for exchanging vehicle information are disclosed. For example, the method receives the vehicle information from a second vehicle, wherein the vehicle information is received via a direct vehicle to vehicle communication, calculates an operating parameter of the second vehicle, determines an alert condition based on the operating parameter of the second vehicle, and provides a notification of the alert condition to a driver of the first vehicle.

20 Claims, 4 Drawing Sheets

(51) Int. Cl.

| | | |
|---|---|---|
| *B60Q 9/00* | (2006.01) | |
| *B60Q 11/00* | (2006.01) | |
| *G07C 5/08* | (2006.01) | |
| *B60Q 3/00* | (2017.01) | |
| *B60T 7/12* | (2006.01) | |
| *F02D 41/22* | (2006.01) | |
| *F02D 41/24* | (2006.01) | |
| *F02D 41/26* | (2006.01) | |
| *F16H 61/02* | (2006.01) | |
| *F16H 63/40* | (2006.01) | |
| *B60W 30/09* | (2012.01) | |
| *B60W 30/18* | (2012.01) | |
| *G08G 1/16* | (2006.01) | |

(52) U.S. Cl.
CPC .............. *B60T 7/12* (2013.01); *B60W 30/09* (2013.01); *B60W 30/18154* (2013.01); *F02D 41/22* (2013.01); *F02D 41/2406* (2013.01); *F02D 41/26* (2013.01); *F16H 61/0202* (2013.01); *F16H 63/40* (2013.01); *G07C 5/08* (2013.01); *G08G 1/162* (2013.01); *G08G 1/163* (2013.01); *B60W 2550/402* (2013.01); *B60W 2550/408* (2013.01)

(56) References Cited

U.S. PATENT DOCUMENTS

| | | | |
|---|---|---|---|
| 6,445,308 B1* | 9/2002 | Koike | G01S 5/0072 180/167 |
| 6,607,255 B2 | 8/2003 | Bond et al. | |
| 6,615,137 B2* | 9/2003 | Lutter | G08G 1/0965 340/436 |
| 6,633,800 B1 | 10/2003 | Ward et al. | |
| 6,765,495 B1 | 7/2004 | Dunning et al. | |
| 6,870,487 B2* | 3/2005 | Nuesser | G08G 1/092 340/901 |
| 6,917,306 B2 | 7/2005 | Lilja | |
| 7,047,114 B1 | 5/2006 | Rogers | |
| 7,102,496 B1 | 9/2006 | Ernst et al. | |
| 7,124,027 B1 | 10/2006 | Ernst et al. | |
| 7,133,768 B2* | 11/2006 | Mukaiyama | G08G 1/161 340/435 |
| 7,266,438 B2* | 9/2007 | Kellum | G01C 21/3697 340/436 |
| 7,277,028 B1 | 10/2007 | Janke | |
| 7,427,929 B2* | 9/2008 | Bauer | G08G 1/162 307/9.1 |
| 7,495,550 B2 | 2/2009 | Huang et al. | |
| 7,532,130 B2 | 5/2009 | Curtis | |
| 8,164,430 B2 | 4/2012 | Nagamine et al. | |
| 8,169,338 B2 | 5/2012 | Mudalige | |
| 8,279,083 B2 | 10/2012 | Tengler et al. | |
| 2001/0012976 A1 | 8/2001 | Menig et al. | |
| 2002/0091473 A1 | 7/2002 | Gardner et al. | |
| 2002/0198632 A1* | 12/2002 | Breed | B60N 2/2863 701/1 |
| 2002/0198660 A1* | 12/2002 | Lutter | G08G 1/0965 701/301 |
| 2003/0139867 A1 | 7/2003 | Browne et al. | |
| 2003/0149530 A1 | 8/2003 | Stopczynski | |
| 2004/0225416 A1 | 11/2004 | Kubota et al. | |
| 2006/0212194 A1 | 9/2006 | Breed | |
| 2006/0212196 A1 | 9/2006 | Davidson et al. | |
| 2007/0027583 A1* | 2/2007 | Tamir | G06Q 30/0283 701/1 |
| 2008/0221745 A1* | 9/2008 | Diamandis | A63K 3/00 701/3 |
| 2010/0073152 A1 | 3/2010 | Nagamine et al. | |
| 2010/0096491 A1* | 4/2010 | Whitelaw | A63K 3/00 244/15 |
| 2010/0112978 A1 | 5/2010 | Cho et al. | |
| 2012/0095641 A1 | 4/2012 | Merk | |
| 2013/0083679 A1 | 4/2013 | Krishnaswamy et al. | |
| 2013/0154853 A1 | 6/2013 | Chen | |
| 2013/0271291 A1 | 10/2013 | Tebbe | |
| 2013/0279491 A1 | 10/2013 | Rubin et al. | |
| 2013/0289859 A1 | 10/2013 | Kim | |
| 2014/0297182 A1* | 10/2014 | Casson | G01C 21/28 701/537 |

OTHER PUBLICATIONS

Wu, Qianhong, Josep Domingo-Ferrer, and Ursula Gonzalez-Nicolas. "Balanced trustworthiness, safety, and privacy in vehicle-to-vehicle communications." Vehicular Technology, IEEE Transactions on 59.2 (2010): 559-573.

Will Knight,"Car-to-Car Communication a Simple Wireless Technology Promises to Make Driving Much Safer", Feb. 12, 2015.

\* cited by examiner

METHOD, COMPUTER-READABLE STORAGE DEVICE AND APPARATUS FOR EXCHANGING VEHICLE INFORMATION

This application is a continuation of U.S. patent application Ser. No. 14/109,145, filed Dec. 17, 2013, now U.S. Pat. No. 9,251,630, and is herein incorporated by reference in its entirety.

BACKGROUND

Car accidents often occur because the drivers involved were not given a sufficient amount of time to react to a particular situation. Such situations may include a car slipping on a wet or icy roadway, a car having a blowout of a tire, a car making a sudden stop to avoid an object appearing on the roadway and the like. Car accidents cause a significant loss of lives and inflict serious injuries to tens of thousands of individuals in this country alone on a yearly basis.

SUMMARY

In one embodiment, the present disclosure describes a method, computer readable storage device and apparatus for exchanging vehicle information. For example, the method receives the vehicle information from a second vehicle, wherein the vehicle information is received via a direct vehicle to vehicle communication, calculates an operating parameter of the second vehicle, determines an alert condition based on the operating parameter of the second vehicle, and provides a notification of the alert condition to a driver of a first vehicle.

In another embodiment, the method receives a request for vehicle information of the first vehicle from a second vehicle, authenticates the request, determines whether a trigger parameter is met, and sends the vehicle information to the second vehicle, wherein the vehicle information is sent via a direct vehicle to vehicle communication, wherein the vehicle information is sent when the request is authenticated and the trigger parameter is met.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method, computer-readable storage device and apparatus for exchanging information between vehicles. For example, in one embodiment, an on-board unit (OBU) in a vehicle may automatically communicate with other on-board units of neighboring vehicles to exchange vehicle information. The vehicle information that is exchanged may comprise current vehicle specification information, historical information and current alert information. In one embodiment, the vehicle information is exchanged via a direct vehicle to vehicle communication. Any communication protocols that can support such direct vehicle to vehicle communication are within the scope of the present disclosure. Direct vehicle to vehicle communication comprises a communication method that does not require an intervening network. For example, the communicating vehicles may utilize dedicated short range communication (DSRC) networks or wireless personal area networks (PANs) having a sufficient range, and the like.

Human reaction time is often too slow in situations where accidents are unfolding in a matter of seconds. In contrast, computing devices are able to process a large volume of data over a short period of time and can be leveraged to assist a driver in an emergency situation while operating a vehicle. For example, the action of braking and the effect on a vehicle is a physical phenomenon that is well understood. More specifically, momentum is defined as a mass multiplied by a velocity. In one example, the initial kinetic energy of the vehicle can be viewed as being equal to the "work" the car does on the tires/road. The equation may take the following form: $0.5 \, mv^2 = Fd$, where m is the mass of the car, v is the initial velocity, F is the force applied, and d is the distance over which the constant force is applied. For example, the constant force in this example may be the amount of force that the brakes will apply when depressed by the driver of the vehicle, where the distance will be the distance traversed by the vehicle in light of the constant force that is applied. In other words, given the relevant parameters, a computing device may quickly deduce the distance that a vehicle will travel based upon a deceleration force that is applied by the brakes. Said another way, the computing device can quickly determine the stopping distance when the brakes are applied for a vehicle. This is only an illustrative example, and many other equations and parameters can be used to determine how quickly a vehicle can stop based on a constant or varying force that is applied.

The above example simply shows that a computing device when provided with the relevant parameters, can quickly deduce the behavior of a vehicle. Other examples can be illustrated in safety systems such as "dynamic stability control system" and "anti-lock brake system" that can be deployed in vehicles. Dynamic stability control system is able to monitor the various physical aspects of a moving vehicle such that it can detect tire slippage, e.g., on a snowy roadway. Responsive to such conditions, the dynamic stability control system may automatically apply braking to an individual wheel and to selectively reduce power to the slipping wheels. Another example is the anti-lock brake system, where upon detecting tire slippage during braking, the anti-lock brake system will "pulse" the brakes of the vehicle rapidly to ensure that the steering mechanism is not locked during a hard braking situation. These various safety systems illustrate how on-board units (OBUs) in a vehicle can quickly make complex calculations and provide automatic controls to various systems (e.g., braking system, engine system and the like) of the vehicle. However, these current operating parameters and the calculated results of these safety systems are often internalized. In other words, such vital information is only used internally by each vehicle, i.e., there is no sharing of such information between various vehicles. In one embodiment of the present disclosure, such vehicle information can be dynamically shared between moving vehicles.

Although the present disclosure is discussed below in the context of exemplary dedicated short range communication (DSRC) networks and cellular access networks, the present disclosure is not so limited. Namely, the present disclosure can be applied to various types of communication networks using various types of communication protocols, e.g., a combination of any one or more of: wired and wireless local area network (LANs), wide area networks (WANs), various types of cellular networks, e.g., general packet radio service (GPRS) networks, uniform terrestrial radio access networks (UTRANs), Global System for Mobile Communications (GSM) networks, Long Term Evolution (LTE) networks, and the like, satellite networks, the Internet in general and so forth.

Figure 1:
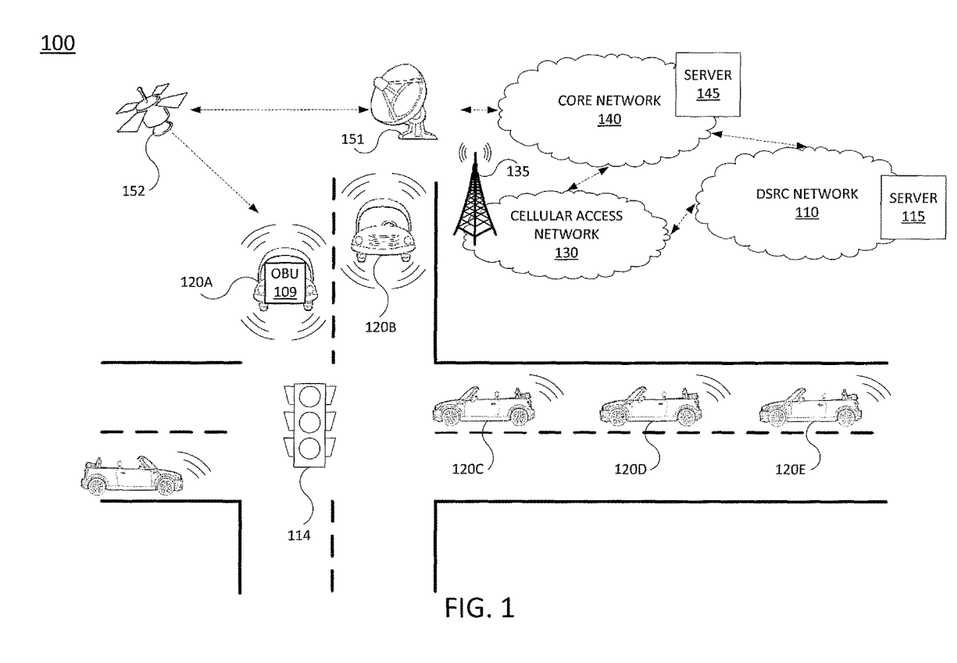
FIG. 1 illustrates an exemplary network related to the present disclosure.

To aid in understanding the present disclosure, FIG. 1 illustrates an exemplary network 100 related to the present disclosure. In one illustrative embodiment, the network 100 comprises a core network 140, a cellular access network 130 and a dedicated short range communication (DSRC) network 110. In one embodiment, cellular access network 130 may comprise a Universal Terrestrial Radio Access Network (UTRAN), or an evolved Universal Terrestrial Radio Access Network (eUTRAN) and the base station 135 may comprise a NodeB or an evolved NodeB (eNodeB). In one example, the core network 140 comprises an Evolved Packet Core (EPC) network. In another embodiment, core network 140 comprises an IP network and/or the Internet in general. In still another example, the cellular access network 130 may comprise a basic service set and the base station 130 may comprise a base transceiver station (BTS). In other words, cellular access network 130 may comprise a second generation (2G) network, a third generation (3G) network, a fourth generation (4G) network and/or a Long Term Evolution (LTE) network, and so forth.

In one embodiment, the network 100 also includes a satellite portion with a satellite uplink 151 and satellite 152. In one embodiment, the cellular access network 130, the core network 140, the DSRC network 110 and/or the satellite portion may be operated by different service providers, the same service provider or a combination thereof. For example, DSRC network 110 may be operated by a governmental entity or a private entity managing a transportation region on behalf of a governmental entity. On the other hand, cellular access network and/or core network may be operated by a telecommunications network service provider. In one embodiment, the satellite portion of the network 100 may be operated by the same or a different telecommunications service provider as that of the cellular access network 130 and/or core network 140. Various interconnections between DSRC network 110, cellular access network 130, core network 140 and other components are shown. In accordance with the present disclosure, it is contemplated that various communication devices may utilize any one or a combination of such networks and interfaces in order to communicate with one another.

In one embodiment, the internal communications of the DSRC network 110 may use a 75 MHz frequency band around 5.925 GHz assigned by the Federal Communication Commission (FCC) of the United States for Intelligent Transportation Systems, or DSRC networks. In general, DSRC networks enable direct wireless vehicle-to-vehicle communications and vehicle-to-infrastructure communications. DSRC networks have been proposed for transmitting safety and road condition information to vehicles, to warn of traffic and weather, to sense nearby vehicles (e.g., blind spot detection), and so forth. In this regard, DSRC networks contemplate an on-board unit (OBU) having a hardware controller or hardware processor for DSRC enabled vehicles to transmit, as well as to receive and display vehicle information and/or messages.

Accordingly, as illustrated in FIG. 1, DSRC network 110 also includes a server 115 for managing infrastructure elements, for communicating with other elements and for controlling other aspects of the DSRC network 110. For example, any one or more of the functions described herein with respect to the DSRC network 110 may be performed by server 115. For instance, DSRC network/server 115 may interconnect with a plurality of vehicles 120A-E to receive vehicle information as discussed below.

In addition, each vehicle 120A-120E illustrated in FIG. 1 may be equipped with an associated on-board unit (OBU) 109 for communicating with the DSRC network 110 and with each other. Although only one OBU 109 is shown in FIG. 1 for clarity, it should be noted that each of the vehicles 120A-120E has a respective OBU. For example, a traffic controller may provide DSRC network 110 with a warning that there is a roadway hazard, e.g., an icing condition, reported at the intersection of traffic light 114. Accordingly, the DSRC network 110 may broadcast a warning message via one or more transmitters near the intersection. In turn, the warning may be received by the OBU of any vehicle approaching the intersection to enable the driver to slow down and/or take other precautions. For example, the OBU may receive the message and present the text of the message on an in-vehicle display. Alternatively or in addition, the OBU may read the message via text-to-speech conversion. In one embodiment, the OBU of each of vehicles 120A-120C may comprise a navigation unit, or is connected to an associated navigation unit. For example, the OBU may include a global positioning system (GPS) navigation unit that assists the driver in navigating a selected route.

In one embodiment, the OBU of each of vehicles 120A-120E may communicate with each other to provide vehicle information. The vehicle information that is exchanged may broadly comprise current vehicle specification information, historical information and/or current alert information.

In one embodiment, the current vehicle specification information may comprise: the weight of the vehicle, the number of passengers in the vehicle (e.g., pressure sensors can be placed in each seat of the vehicle to detect an occupant for each seat), the speed or velocity of the vehicle (e.g., via a speedometer in the vehicle), the braking capability of the vehicle (e.g., measured in feet/sec. of deceleration based on actual measures), the current tire pressures of the vehicle, the thickness of the brake pads of the vehicle, the type of tires on the vehicle (e.g., all season tires, performance tires, snow tires, racing tires, and the like), the current proximity information relating to neighboring vehicles (e.g., proximity sensors indicating the proximate distance of a vehicle in front of the vehicle and the proximate distance of a vehicle behind the vehicle) and the like. In sum, the current vehicle specification information comprises various current operating parameters of the vehicle.

In one embodiment, the historical information may comprise: the maintenance history of the vehicle (e.g., the types of services that have been performed on the vehicle, the number of miles traversed on the current set of tires, and the like), and historical performance of the vehicle (e.g., historical performance of the vehicle such as braking capability, the number of slippage incidences as recorded by the OBU during operation of the vehicle, the number of occurrences of braking based on: distance traveled, road condition, time of date, thereby providing a braking profile of the driver), and the like. In sum, the historical information comprises various historical operating parameters of the vehicle.

In one embodiment, the current alert information may comprise: a wheel of the vehicle is slipping, the vehicle is applying automated braking (e.g., as applied by the vehicle stability control system), the vehicle is applying automated throttling (e.g., as applied by the vehicle stability control system), the vehicle is pulsing the brakes (e.g., as applied by the vehicle anti-lock braking system), the vehicle is trying to alert the driver of the vehicle (e.g., when a vehicle safety system that detects the driver is dozing off, when a vehicle safety system that detects that the pressure for the brakes is abnormally low, e.g., loss of brake fluid in the master cylinder, when a vehicle safety system that detects that the oil pressure for the engine is abnormally low, e.g., loss of motor oil, and the like) and the like. In sum, the current alert information comprises various parameters that are currently creating an alert within the vehicle.

Referring to FIG. 1, for example, when vehicle 120A is experiencing a slippage, the dynamic stability control system of vehicle 120A may automatically apply braking to selective wheels of the car and simultaneously reduce power to the wheels. This automated action taken by vehicle 120A is often made without the knowledge of vehicle 120B that is travelling slightly behind vehicle 120A. In one embodiment, the OBU of vehicle of 120A would immediately broadcast such current alert information to surrounding vehicles, e.g., within 10-20 meters of vehicle 120A. In doing so, the OBU of vehicle 120B would be able to detect that the driver of vehicle 120A is experiencing an alert situation, e.g., the intervention of one or more systems in vehicle 120A. In response, the OBU of vehicle 120B may display a warning message on a screen or play an audio message on a speaker such as "vehicle in front to the right is slipping". In one embodiment, the OBU of vehicle 120B may present a recommendation in view of vehicle 120A experiencing a slippage episode, e.g., the recommendation may comprise: "reduce speed and stay away from vehicle in front to the right", "accelerate and pass vehicle in front to the right", "change lane and stay away from vehicle in front to the right", and so on. In one embodiment, the OBU of vehicle 120B may implement driver assisted functions such as: reducing engine power of vehicle 120B, applying the brakes of vehicle 120B slightly, applying the emergency lights of vehicle 120B to notify vehicles behind vehicle 120B that vehicle 120B may have to take emergency maneuvers, and so on. In one alternate embodiment, the OBU of vehicle 120B may optionally engage an event recording feature, e.g., an optical sensor such as a camera on the vehicle 120B to capture images or videos (and sound recordings when a microphone is available) related to the alert information. For example, if a subsequent accident does occur between the two vehicles 120A and 120B, then a record of the accident will be automatically generated.

Referring to FIG. 1, the received information can be broadcasted in a cascade manner. For example, vehicle 120C is approaching traffic light 114 and experiences a slippage condition. The OBU of vehicle 120C may immediately broadcast current alert information, e.g., to vehicle 120D. Such current alert information will assist vehicle 120D to take the proper action, but the current alert information of vehicle 120C may not reach vehicle 120E travelling immediately behind vehicle 120D. In one embodiment, the OBU of vehicle 120D will broadcast the current alert information of vehicle 120C to the vehicle 120E. This will avoid the scenario where multiple vehicles are involved in a "pile-up" accident, where subsequent vehicles continue to add to an existing accident, e.g., due to poor visibility of the existing accident or lack of information. For example, if a roadway suddenly experiences a white out condition, e.g., a rolling fog, a rolling sand storm, a rolling cloud of smoke from a fire near a roadway, a sudden snow storm, and the like, many vehicles will tend to make drastic speed reduction when the vehicles are enveloped in the white out condition. Unfortunately, subsequent vehicles approaching the white out condition, but not yet within the white out condition, may not have taken drastic speed reduction actions due to the fact that these vehicles are not yet impacted by the white out condition. By the time these subsequent vehicles are enveloped by the white out condition, it may be too late to drastically reduce speed in a timely manner to avoid the earlier vehicles that have already taken such drastic actions. This scenario is often the cause for a large chain reaction of vehicle collisions.

In another embodiment, vehicle 120C may broadcast current vehicle specification information and/or historical information to vehicle 120D. It should be noted that the broadcast of current vehicle specification information and/or historical information is done without the existence of an alert condition as discussed above. In other words, such vehicle specification information and/or historical information can be provided to other vehicles for informational purposes. For example, the OBU of vehicle 120C may broadcast current vehicle specification information, e.g., the vehicle's current weight and current speed to vehicle 120D. Additionally, the OBU of vehicle 120C may also broadcast historical information, e.g., vehicle 120C's historical braking capability in terms of feet/sec or meter/sec. In turn, the OBU of vehicle 120D may compute the braking distance for vehicle 120C that is currently in front of vehicle 120D, e.g., if vehicle 120C needs to make an emergency stop. Knowing the emergency braking distance or capability of vehicle 120C, the OBU of vehicle 120D may make recommendation to the driver of vehicle 120D as to the recommended distance that he or she needs to maintain with vehicle 120C. For example, if vehicle 120C is a sports car with a high performance braking system and vehicle 120D is a mini-van or a truck that is heavily loaded, then the OBU of vehicle 120D will be able to determine the preferred emergency braking distance of vehicle 120D relative to vehicle 120C. If it is determined that the current distance separating the two vehicles 120C and 120D is not safe, given that vehicle 120D will not likely be able to stop in time if vehicle 120C came to a sudden stop, the OBD of vehicle 120D may provide a notification to the driver of vehicle 120D.

The notification can be in the form of a visual recommendation, e.g., a message that is displayed on the dash (e.g., "too close to vehicle in front") or a highlighted number that is displayed on the dash (e.g., showing a sequence of decreasing number, e.g., "5 . . . 4 . . . 3 . . . 2 . . . 1", as the driver increases the distance separating the two vehicles). The notification can be in the form of an audio recommendation, e.g., a beep or a bong to indicate that the distance separating the two vehicles are not safe. The notification can be in the form of a tactile recommendation, e.g., the steering wheel may provide a predefined type of vibration to indicate that the distance separating the two vehicles are not safe.

It should be noted that the broadcast of vehicle information can be selectively based on a number of different triggers (broadly trigger parameters). For example, a speed trigger can be based on the speed of the vehicle. For example, a manufacturer or a driver may configure the OBU of a vehicle to only broadcast vehicle information above the operating speed of 35 mph, or 40 mph and so on. Namely, in one embodiment, vehicle information is only broadcasted when the vehicle is travelling at a high rate of speed, e.g., on a highway or a freeway.

A proximity trigger can be based on proximity of other vehicles. For example, a manufacturer or a driver may configure the OBU of a vehicle to only broadcast vehicle information to other vehicles that are within a predetermined proximity to a vehicle, e.g., within 10 meters, 15 meters, 20 meters and so on. Namely, when there are no nearby vehicles, vehicle information will not be broadcasted.

A directional trigger can be based on the direction of other vehicles. For example, a manufacturer or a driver may configure the OBU of a vehicle to only broadcast vehicle information to other vehicles that are within a predetermined direction to a vehicle, e.g., directly in front of the vehicle, directly behind the vehicle, directly to the left of the vehicle, directly to the right of the vehicle, directly to the north of the vehicle, directly to the south of the vehicle, directly to the west of the vehicle, directly to the east of the vehicle, and so on. Namely, when there are no nearby vehicles in one or more selected directions, vehicle information will not be broadcasted.

An on-demand trigger can be based on the ad hoc requests of other vehicles. For example, a manufacturer or a driver may configure the OBU of a vehicle to only broadcast vehicle information to other vehicles when it is requested or polled by other vehicles. For example, referring to FIG. 1, vehicle 120D may approach vehicle 120C from behind and broadcast a request to receive vehicle information from vehicle 120C. Upon the receipt of the request, the OBU of vehicle 120C will broadcast the requested vehicle information. In one embodiment, if an on-demand trigger is not implemented, then the OBU of a vehicle can be implemented such that the OBU is always broadcasting vehicle information to neighboring vehicles.

In one embodiment, the request may selectively request one or more types of vehicle information. For example, a manufacturer or a driver may configure the OBU of a vehicle to only request one or more of: the current vehicle specification information, the historical information and/or the current alert information. For example, the OBU of a vehicle may only request the receipt of the current vehicle specification information, and the current alert information from other vehicles and forego the reception of any historical information.

In one embodiment, the request may be authenticated before any vehicle information is provided. For example, a driver of a vehicle may only want to comply with a request for his or her vehicle information only for the purpose of assisting other OBUs of other vehicles that are currently on the road. In other words, the driver may be willing to provide his or her vehicle information for the purpose of ensuring safety of the driving public, but may not want to provide his or her vehicle information for any other purposes. For example, vehicle 120C may be willing to provide vehicle information to vehicle 120D only if the request indicates that vehicle 120D is immediately behind vehicle 120C. In another example, vehicle 120C may be willing to provide vehicle information to vehicle 120D only if the request indicates that vehicle 120D is immediately behind vehicle 120C and travelling at speed above 30 mph. Authentication may also require that the requesting OBU provides some form of identification information such as but not limited to the license plate of the requesting vehicle, the registration number of the requesting vehicle, the license number of the driver of the requesting vehicle, an email address of the driver of the requesting vehicle, a phone number of the driver of the requesting vehicle, a unique manufacturer identification number for the vehicle, a unique number managed by a third party service provider for providing the service of tracking vehicles, and the like.

It should be noted that any number of sensors can be deployed in conjunction with the OBU as discussed above. For example, a proximity or a range sensor can be deployed at the periphery of the vehicles, e.g., at the four corners of vehicles 120A and 120B. The proximity or range sensor may employ RF signaling or optical signaling such as infrared signals and the like. Furthermore, directional antennas having a plurality of antenna elements can be used. Such directional antennas can be used to determine the direction of a request. For example, using such directional antennas, vehicle 120D will be able to determine a request for vehicle information from vehicle 120C in front as compared to vehicle 120E from behind. Such directional antennas will be useful when many vehicles are transmitting vehicle information at the same time. For example, even if each vehicle includes a unique Identification (e.g., license plate number and the State that issued the license plate) along with the vehicle information, it is difficult to determine the direction from which the vehicle information is received from. With the assistance of the directional antennas, the OBU can quickly determine the direction of the received signal, thereby correlating the vehicle information to a particular proximate vehicle, e.g., the vehicle in front, the vehicle in front to the left, the vehicle in front to the right, the vehicle behind, the vehicle to the right, the vehicle to the left, and so on.

The various sensors may also include impact sensors, when the vehicle is actually involved in an accident. The impact sensors may help in accident recreation, e.g., the sequence of impact sensors being triggered will assist in understanding how an accident unfolded, e.g., how the vehicles collided.

The various sensors may also include a camera for capturing images or video. For example, the camera can capture a license plate of a neighboring vehicle. In fact, if a machine-readable code, e.g., a QR code or a bar code, is deployed on a vehicle, e.g., on a license plate of the vehicle, the camera can serve to capture the machine-readable code which may contain certain vehicle information as discussed above or an identification of the vehicle.

The various sensors may also include a moisture sensor to detect moisture around the vehicle, e.g., whether it is raining around the vehicle, whether there is water on the roadway. The various sensors may also include a temperature sensor to detect the temperature on the roadway. It should be noted that various sensors may already exist in the vehicle for other purposes, e.g., a speedometer, a tachometer, a clock, a temperature sensor and the like. As such, such existing sensors can be used to provide the necessary information without the need to deploy redundant sensors. In other words, the OBU can be designed to interact with existing sensors of the vehicle.

In one embodiment, the received vehicle information is only retained for a short period of time, e.g., 30 minutes, 1 hour, a day, a week, and so on. For example, it is often the case that a vehicle may travel with other vehicles on the highway only for a short duration, e.g., in the order of minutes. Thus, the OBU may not need to store a large volume of vehicle information from other vehicles. The OBU may only need to store the current set of vehicle information for vehicles that are currently proximate to the vehicle.

In another embodiment, each OBU may store and then offload received vehicle information periodically. For example, traffic lights and toll booths may be equipped with transceivers that can receive stored vehicle information that is sent from OBUs of vehicles passing near the traffic lights or toll booths. Private businesses such as gas stations can also be solicited to participate in the data collection network. The collected vehicle information can be forwarded to the DSRC network 110 as discussed above. Collection of such vehicle information can be used for different purposes. For example, the collected vehicle information may reveal certain trends, e.g., certain portions of a roadway may be particularly slick during certain conditions as revealed from a large set of vehicle information, certain portions of a roadway may experience a high rate of illegal speeding by drivers, certain portions of a roadway may experience a high rate of rapid braking by drivers, and so on. In one embodiment, the collected "OBU" information from a plurality of vehicles can be used to generate an alert, e.g., an alert to be broadcasted that a certain portion of a roadway is very "slick" based on recently collected OBU information. In other words, the drivers do not need to actively provide such driving condition information, since their respective OBU can be configured to provide such information automatically, thereby benefiting other drivers who may be approaching that very same portion of the roadway, e.g., as planned via a navigation system in the vehicle. A centrally located application server or a cloud based implementation (e.g., distributed across a plurality of application servers) can be configured to deduce such potentially dangerous driving conditions for generating such alerts. Again, receiving such alert by a vehicle can be implemented via the same collection points as discussed above. In other words, such collection points are equipped with transceivers to receive OBU information as well as to provide alerts to the vehicles.

Such vehicle information may provide helpful insights to various government agencies such as the department of transportation, or a law enforcement agency such as the state police. In fact, private entities may be interested in the collected information as well. For example, insurance companies may want such information to assess the proper insurance premium and the like.

The collected vehicle information may be used in a manner to protect the identity of the vehicle and the vehicle's owner. In other words, using the collected vehicle information to determine treacherous portions of a roadway does not require the knowledge of the identity of the vehicle or the identity of the driver. In such situations, the collected vehicle information is used in an anonymous manner to protect the drivers' privacy.

Alternatively, the collected vehicle information may be used in a manner to purposely identify the identity of the vehicle and its owner. For example, if it was determined that a vehicle was struck from behind by an unidentified vehicle on the highway and the unidentified vehicle did not stop after the accident, then the collected information can be analyzed to determine the identity of the unidentified vehicle. For example, vehicle information may have been received from the OBU of the unidentified vehicle which may include the identity of the vehicle.

In one embodiment, the OBU may simply store the vehicle information for as long as possible. Namely, as long as the memory of the OBU is sufficient to hold the vehicle information, the vehicle information from other vehicles will not be deleted. However, if storage space in the memory is needed, the "oldest" vehicle information stored in the memory will be deleted first to make room on the memory. Since time stamps are applied to the vehicle information, the OBU will be able to deduce which stored vehicle information is the oldest.

Figure 2:
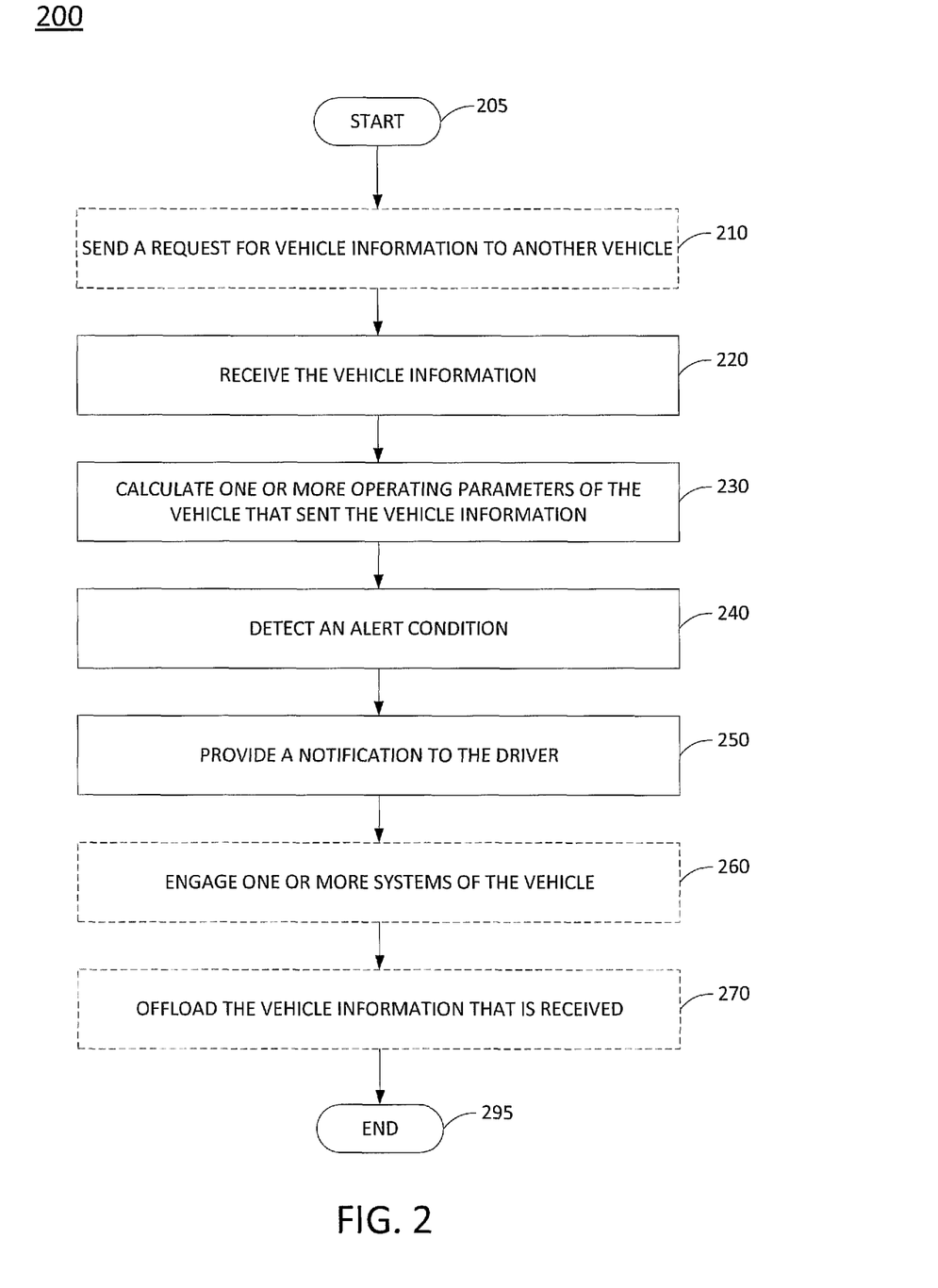
FIG. 2 illustrates a flowchart of a method for exchanging information between vehicles, according to embodiments of the present disclosure.

FIG. 2 illustrates a flowchart of a method 200 for exchanging information between vehicles, according to embodiments of the present disclosure. In one embodiment, the method 200 is performed by an OBU deployed in a vehicle, such as illustrated in FIG. 1. Alternatively, or in addition, the steps, functions, or operations of method 200 may be performed by a computing device or system 400, and/or processor 402 as described in connection with FIG. 4 below.

Method 200 starts in step 202 and proceeds to step 210. In step 210, method 200 optionally sends a request for vehicle information. If an on-demand implementation is deployed, a vehicle 120D may approach a vehicle 120C from behind and sends a request to vehicle 120C to receive vehicle information from vehicle 120C. In one embodiment, if authentication is required, then the request that is sent contains the necessary information required for the proper authentication as discussed above.

In step 220, the method 200 receives the vehicle information from vehicle 120C. For example, the vehicle information that is received may comprise current vehicle specification information, historical information and/or current alert information.

In step 230, the method 200 calculates one or more operating parameters of vehicle 120C using the received vehicle information. The one or more operating parameters may comprise a braking operating parameter of vehicle 120C (e.g., the distance that vehicle 120C will need to come to a complete stop), an acceleration operating parameter of vehicle 120C (e.g., the rate in which vehicle 120C may accelerate given vehicle 120C's current weight and engine displacement), a road gripping operating parameter of vehicle 120C (e.g., a measure of road holding capability given the type of tires on vehicle 120C, the vehicle 120C's current weight, and the current road condition), and the like.

In step 240, the method 200 detects an alert condition. For example, method 200 may detect that the distance separating vehicles 120C and 120D is too short given that method 200 has deduced the braking operating parameter of vehicle 120C. In other words, method 200 has detected a potential safety concern that may affect the driver of vehicle 120D. For example, if vehicle 120D is a large truck with a heavy load and vehicle 120C is a sports car with a high performance braking system, method 200 may deduce after the calculation that vehicle 120D should decelerate to maintain a larger separating distance to ensure proper braking distance should an emergency situation suddenly occur.

In step 250, method 200 provides a notification to the driver of vehicle 120D. The notification can be a visual notification, e.g., a message on a display screen, or a highlighted icon on a dashboard. The notification can be an audible notification, e.g., an audio message played on a speaker, or a bong or a beep audible signal. The notification can be a tactile notification, e.g., a vibration on the steering wheel, and the like.

In step 260, method 200 may optionally engage one or more systems of the vehicle. For example, the method 200 may optionally apply the braking system to slow the vehicle down. The method 200 may optionally apply the emergency lights or head lights on the vehicle 120D. The method 200 may optionally reduce power from the engine system (e.g., reduce fuel, close down certain engine cylinders, reduce air flow, and the like) to slow the vehicle down. The method 200 may optionally select a different gear from the transmission system to slow the vehicle down and so on.

In step 270, method 200 may optionally offload or upload the vehicle information that has been received and stored. For example, the vehicle information received from vehicle 120C can be offloaded to the DSRC network, e.g., when passing a traffic light, when passing a toll booth, when fueling a vehicle at participating gas stations or any other data collecting points designated by a government agency or a private service provider.

Method 200 ends in step 270 or returns to step 210 to send another request to another vehicle.

Figure 3:
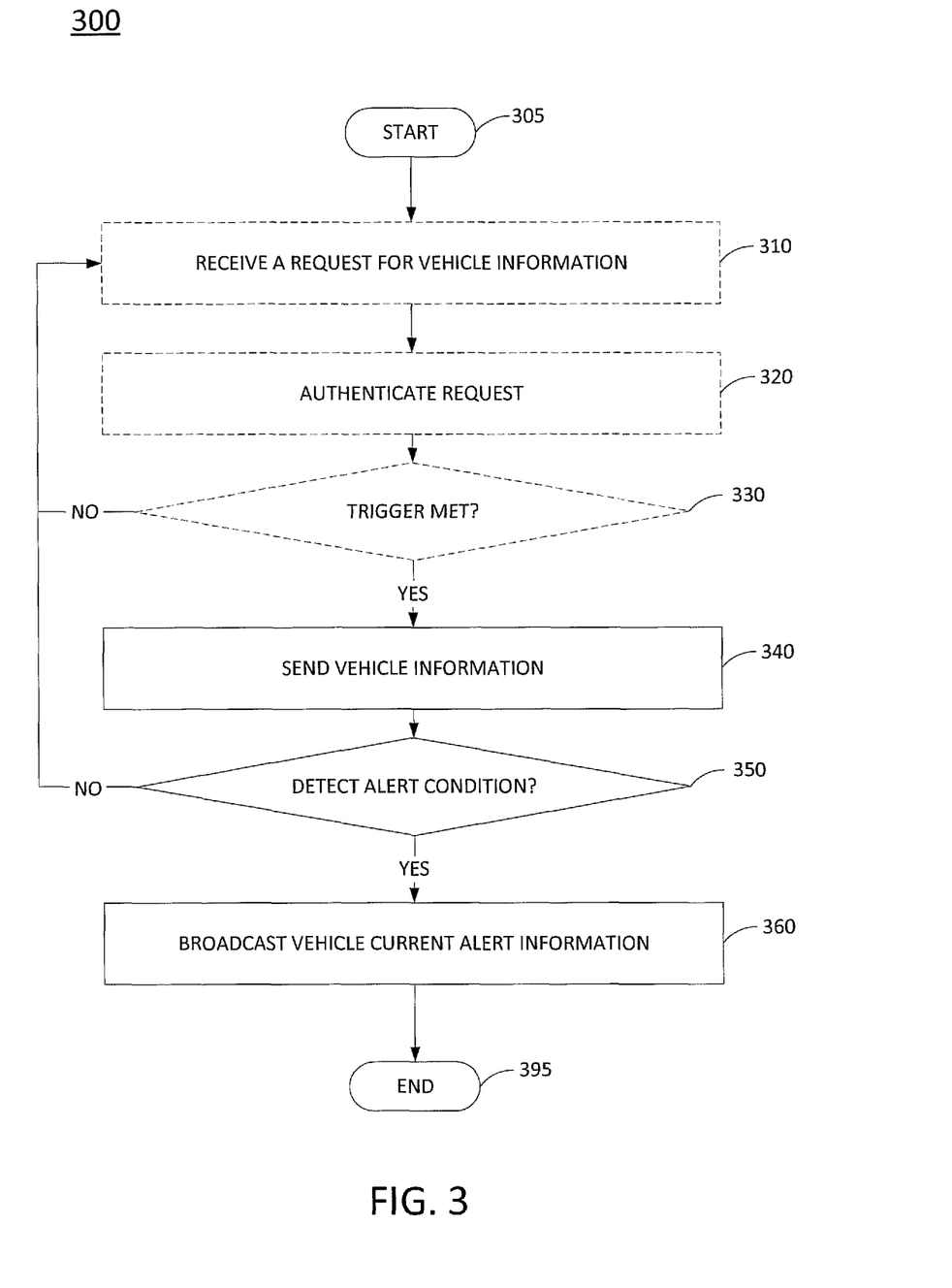
FIG. 3 illustrates a flowchart of a method for exchanging information between vehicles, according to embodiments of the present disclosure.

FIG. 3 illustrates a flowchart of a method 300 for exchanging information between vehicles, according to embodiments of the present disclosure. In one embodiment, the method 300 is performed by an OBU deployed in a vehicle, such as illustrated in FIG. 1. Alternatively, or in addition, the steps, functions, or operations of method 300 may be performed by a computing device or system 400, and/or processor 402 as described in connection with FIG. 4 below.

Method 300 starts in step 302 and proceeds to step 310. In step 310, method 300 optionally receives a request for vehicle information. If an on-demand implementation is deployed, vehicle 120C that is in front of an approaching vehicle 120D may receive a request from vehicle 120D to receive vehicle information of vehicle 120C.

In one embodiment, if authentication is required, method 300 in step 320 will authenticate the request. For example, method 300 may verify whether the request contains the necessary information required for the proper authentication. Depending on the authentication method, necessary information may comprise information that provides the identity of the vehicle, information that provides the identity of driver of the vehicle, information that provides a confirmation that the requesting vehicle is currently operating on the same roadway, information that provides a confirmation that the requesting vehicle is currently operating on the same roadway in near proximity to the vehicle receiving the request, and the like.

In step 330, the method 300 may optionally determine whether one or more triggers have been met to provide the requested vehicle information. For example, a trigger can be predefined as a speed trigger, a proximity trigger, a directional trigger, or an on-demand trigger as discussed above. If a trigger is not met, method 300 ignores the request and returns to step 310. If the trigger is met, method 300 proceeds to step 340.

In step 340, the method 300 sends the vehicle information. The vehicle information that is sent may comprise current vehicle specification information, historical information and/or current alert information.

In step 350, the method 300 determines whether an alert condition is detected. For example, method 300 may detect that a tire of the vehicle 120C is slipping, that the braking system is compromised, e.g., losing braking fluid, or that the engine system has a low oil pressure condition, e.g., losing motor oil and so on. If an alert condition is not detected, method 300 returns to step 310. If an alert condition is detected, method 300 proceeds to step 360.

In step 360, method 300 broadcasts current alert information to all neighboring vehicles. For example, the cause (e.g., lost of braking capacity) and response taken (e.g., reducing engine power) by vehicle 120C is made known to all surrounding vehicles such as vehicle 120D. This preemptive notification will allow an OBU of a respective neighboring vehicle to inform the respective driver that vehicle 120C is experiencing an operating problem.

Method 300 ends in step 395 or returns to step 310 to receive another request from another vehicle.

In addition, although not specifically specified, one or more steps, functions or operations of the methods 200 and 300 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIGS. 2-3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the example embodiments of the present disclosure.

Finally, the application server 115 and/or application server 145 as discussed in FIG. 1 may perform various post data collection analysis methods. For example, if a large volume of vehicle information is collected over a period of time, the application server 115 and/or application server 145 may perform analysis that provides insights into various trends such as roadway conditions, driver behaviors, accident recreations, and the like. This historical data can be used by various agencies such as the Department of Transportation (DOT) as input for traffic engineering planning and the like. Finally, the analysis can also be monetized as a service (e.g., a subscription service). For example, the analysis may provide insights into driving conditions that can be dynamically provided to drivers who are currently traversing on a particular roadway. In other words, a user may subscribe to a subscription service that indicates the current "driving" condition for one or more roads. More specifically, the "driving" condition will provide information as to the driving condition that a driver will likely have to face, versus other roadway conditions such as "congestion" of the roadway or the "volume" of cars on the roadway. Said another way, the "driving" condition will provide insights as to the likely behavior of the vehicle when encountering the "driving" condition, e.g., slipping, sliding, difficulty with braking, and the like. Such "driving" condition information will provide greater insights and assistance to a driver aside from information such as congestion. In other words, roadway conditions may impact a driver's decision as to the convenience of operating the vehicle, whereas "driving" condition may impact a driver's decision as to the safety of operating the vehicle.

The term "vehicle" is intended to encompass an array of different types of vehicles. For example, vehicles may encompass cars, trucks, motorcycles, recreational vehicles (RVs), buses, various farming vehicles, tractors, various construction vehicles, and the like.

Figure 4:
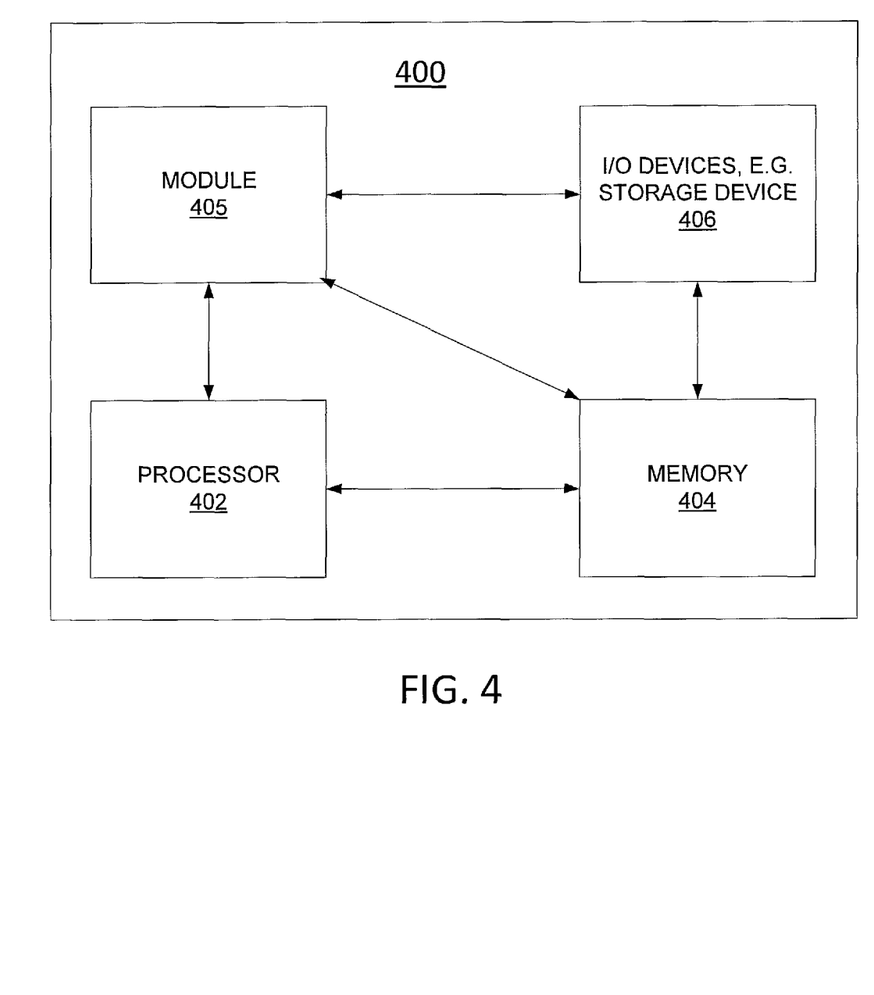
FIG. 4 illustrates a high-level block diagram of a general-purpose computer suitable for use in performing the functions, methods and algorithms described herein.

FIG. 4 depicts a high-level block diagram of a general-purpose computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for exchanging information between vehicles, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one embodiment, instructions and data for the present module or process 405 for exchanging information between vehicles (e.g., a software program comprising computer-executable instructions) can be loaded into memory 404 and executed by hardware processor element 402 to implement the steps, functions or operations as discussed above in connection with the exemplary methods 200 and 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for exchanging information between vehicles (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable storage device storing a plurality of instructions which, when executed by a processor of a first vehicle, cause the processor to perform operations for receiving vehicle information, the operations comprising:

receiving the vehicle information from a second vehicle, wherein the vehicle information is received via a direct vehicle to vehicle communication, wherein the vehicle information comprises at least one of: a weight of the second vehicle, a braking capability of the second vehicle, a tire pressure of the second vehicle, a thickness of a brake pad of the second vehicle, or a type of tire of the second vehicle;

calculating an operating parameter of the second vehicle using the vehicle information that is received;

determining an alert condition based on the operating parameter of the second vehicle; and providing a notification of the alert condition to a driver of the first vehicle.

2. The non-transitory computer-readable storage device of claim 1, the operations further comprising:

sending a request for the vehicle information to the second vehicle prior to receiving the vehicle information from the second vehicle.

3. The non-transitory computer-readable storage device of claim 2, wherein the request contains information that is required for authentication.

4. The non-transitory computer-readable storage device of claim 3, wherein the information that is required for authentication comprises identity information of the first vehicle.

5. The non-transitory computer-readable storage device of claim 3, wherein the information that is required for authentication comprises identity information of the driver of the first vehicle.

6. The non-transitory computer-readable storage device of claim 1, the operations further comprising:

sending the vehicle information that is received from the second vehicle to an application server that is deployed in a network.

7. The non-transitory computer-readable storage device of claim 1, the operations further comprising:

engaging a system of the first vehicle.

8. The non-transitory computer-readable storage device of claim 7, wherein the system of the first vehicle comprises a braking system.

9. The non-transitory computer-readable storage device of claim 7, wherein the system of the first vehicle comprises a lighting system.

10. The non-transitory computer-readable storage device of claim 7, wherein the system of the first vehicle comprises an engine system.

11. The non-transitory computer-readable storage device of claim 7, wherein the system of the first vehicle comprises a transmission system.

12. The non-transitory computer-readable storage device of claim 1, wherein the notification comprises a visual notification.

13. The non-transitory computer-readable storage device of claim 1, wherein the notification comprises an audible notification.

14. The non-transitory computer-readable storage device of claim 1, wherein the notification comprises a tactile notification.

15. The non-transitory computer-readable storage device of claim 1, wherein the vehicle information further comprises historical information.

16. The non-transitory computer-readable storage device of claim 1, wherein the vehicle information further comprises current alert information.

17. A method for sending vehicle information, the method comprising:
- receiving, by a processor of a first vehicle, from a second vehicle, a request for the vehicle information of the first vehicle, wherein the vehicle information comprises at least one of: a weight of the first vehicle, a braking capability of the first vehicle, a tire pressure of the first vehicle, a thickness of a brake pad of the first vehicle, or a type of tire of the first vehicle;
- authenticating, by the processor, the request;
- determining, by the processor, whether a trigger parameter is met; and
- sending, by the processor, the vehicle information to the second vehicle, wherein the vehicle information is sent via a direct vehicle to vehicle communication, wherein the vehicle information is sent when the request is authenticated and the trigger parameter is met.

18. The method of claim 17, wherein the trigger parameter comprises a proximity trigger parameter.

19. An apparatus for sending vehicle information, the apparatus comprising:
- a processor of a first vehicle; and
- a computer-readable storage device storing instructions which, when executed by the processor, cause the processor to perform operations, the operations comprising:
  - receiving from a second vehicle, a request for the vehicle information of the first vehicle, wherein the vehicle information comprises at least one of: a weight of the first vehicle, a braking capability of the first vehicle, a tire pressure of the first vehicle, a thickness of a brake pad of the first vehicle, or a type of tire of the first vehicle;
  - authenticating the request;
  - determining whether a trigger parameter is met; and
  - sending the vehicle information to the second vehicle, wherein the vehicle information is sent via a direct vehicle to vehicle communication, wherein the vehicle information is sent when the request is authenticated and the trigger parameter is met.

20. The apparatus of claim 19, wherein the trigger parameter comprises a proximity trigger parameter.

* * * * *